Nov. 3, 1964                G. W. WALLS                3,155,902
    METHOD AND APPARATUS FOR DETERMINING MOISTURE CONTENT OF
        DIELECTRIC MATERIALS BY MEASURING THE RATIO
            OF VOLTAGE CHANGES AT TWO FREQUENCIES
Original Filed Sept. 5, 1956                    2 Sheets-Sheet 2
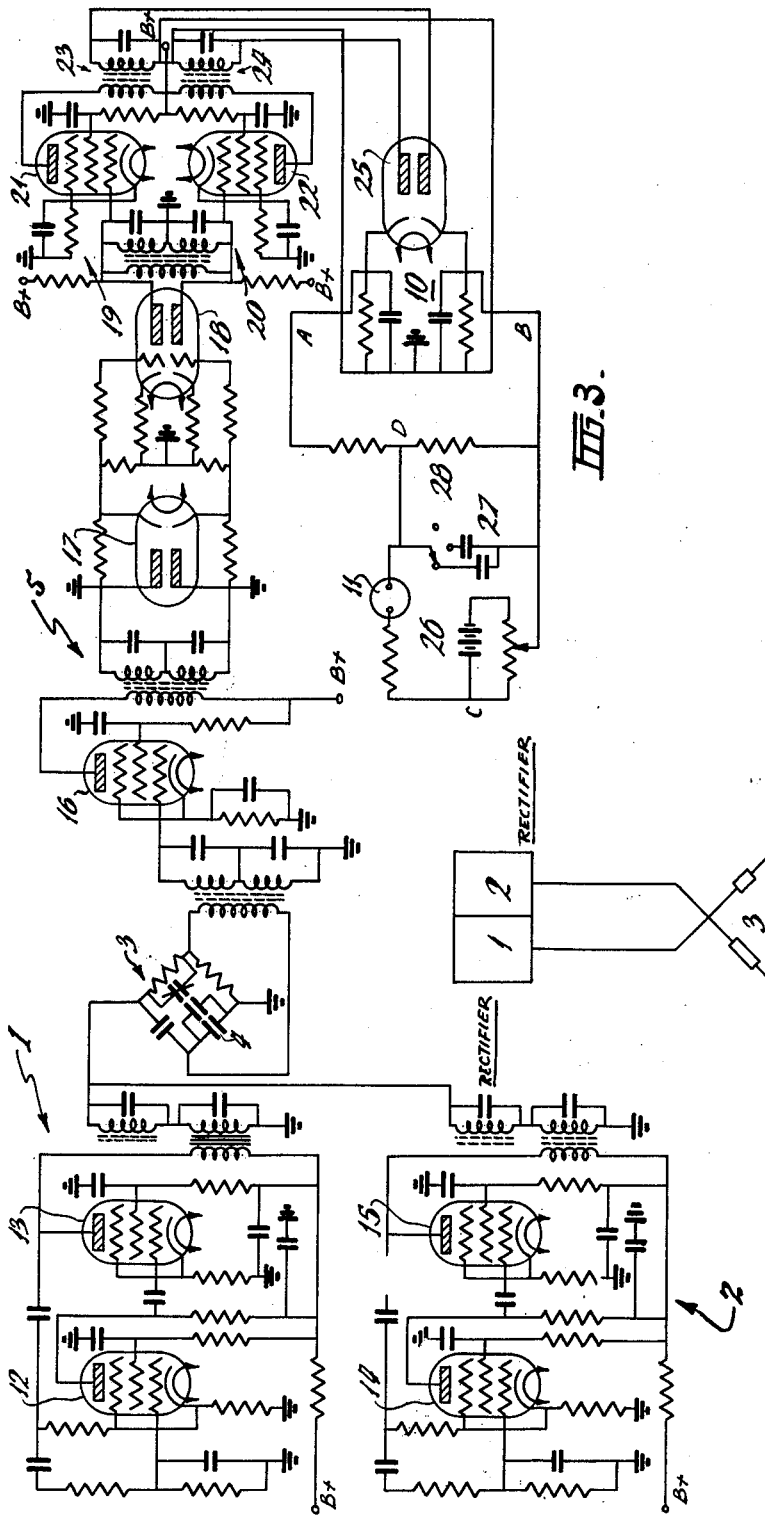
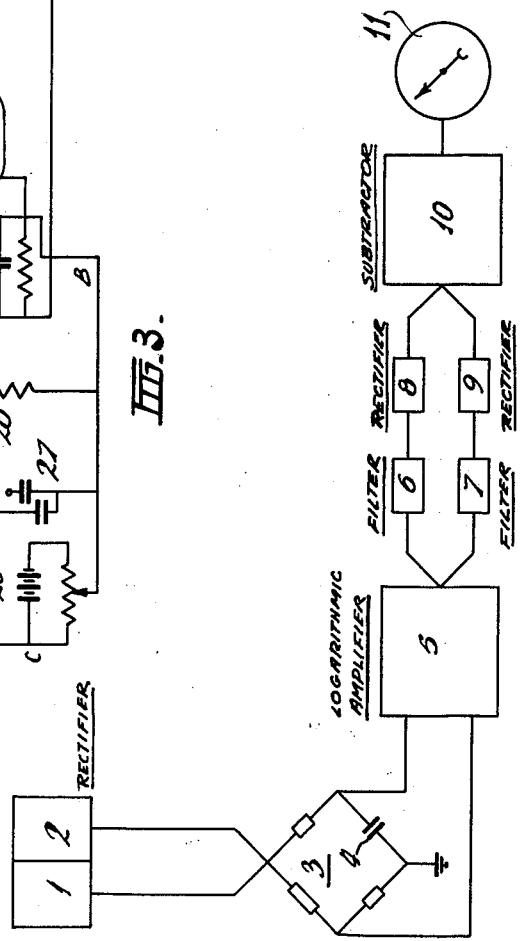

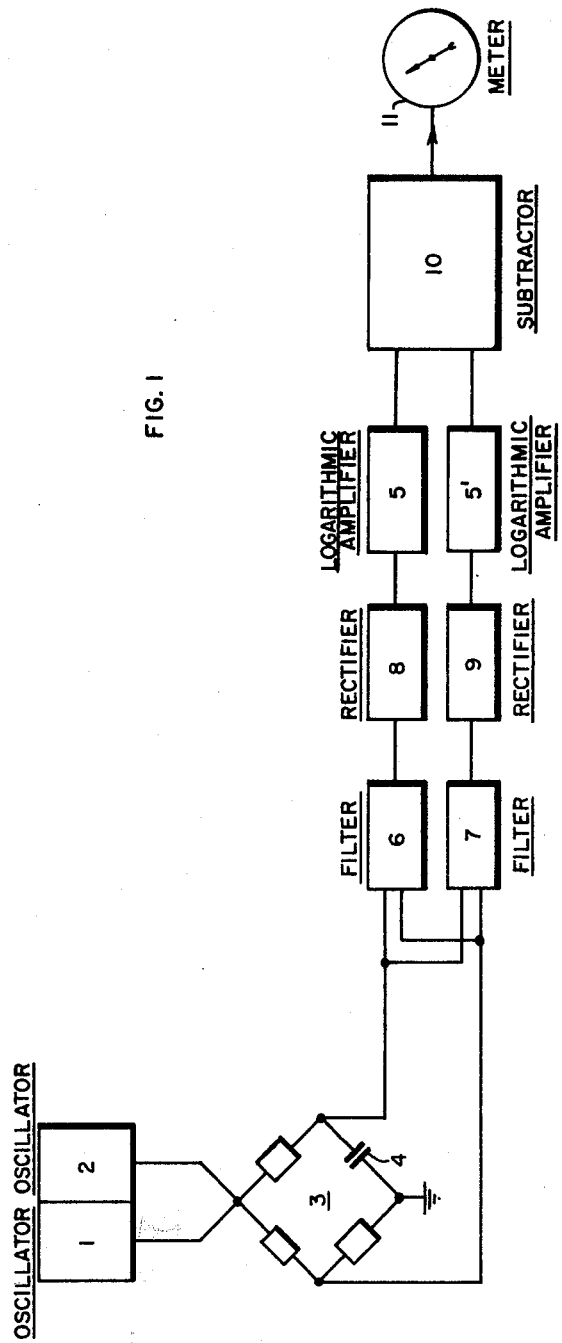

United States Patent Office 3,155,902
Patented Nov. 3, 1964

3,155,902
METHOD AND APPARATUS FOR DETERMINING MOISTURE CONTENT OF DIELECTRIC MATERIALS BY MEASURING THE RATIO OF VOLTAGE CHANGES AT TWO FREQUENCIES
Gordon William Walls, Geelong, Victoria, Australia, assignor to Industrial Nucleonics Corporation, a corporation of Ohio
Continuation of application Ser. No. 608,095, Sept. 5, 1956. This application Nov. 16, 1962, Ser. No. 238,838
11 Claims. (Cl. 324—61)

This invention relates to a method and apparatus for measuring the moisture content of textile fibers and materials and other dielectric materials of which the dielectric constant changes as the frequency of a voltage applied to them changes. This is a continuation of copending application Serial No. 608,095, filed September 5, 1956, now abandoned, by Gordon William Walls for Method and Apparatus for Determining the Moisture Content of Dielectric Materials.

It is known that the dielectric constant of materials of the above type is also dependent on the moisture content and this moisture content can be measured by placing or passing the material between the plates of a condenser and measuring the dielectric properties of the material at two different frequencies. It is also known that such measurement can be made independent of the mass of the material between the plates.

These known methods all suffer from one or more of the following defects:

(a) The measurement is not independent of the position of the material between the plates.

(b) Manual balancing adjustments are required, thus preventing the measuring instrument from being used to obtain continuous measurement as is desirable, for instance in the measurement of the moisture content of a moving strip of textile material.

(c) The lack of stability of the measuring instruments is such as to reduce their accuracy to a value considerably below that which is theoretically possible.

(d) They cannot be used effectively on greasy or adulterated materials (e.g., dyed textiles or those containing electrolytes such as sodium carbonate).

(e) Measurements are affected by outside disturbances such as variation in applied voltage and ageing of circuit components.

(f) The measurement is not independent of the temperature of the material between the plates.

It is the object of this invention substantially to avoid these above stated defects.

Throughout the following description and claims, reference will be made to the use of "voltages" as the operative electrical quantities in the methods and apparatus according to the invention. It is to be understood, however, that other suitable electrical quantities, such as currents, could be used; provided that the circuit components were, where necessary, suitably adjusted to make them responsive to those other quantities. Accordingly reference hereinafter to "voltages" is meant to refer also to any other such quantity.

According to this invention there is provided apparatus for determining the moisture content in material of the type referred to, comprising a test condenser having plates between which the material may be located, means for feeding to the test condenser at least two voltages of different frequencies, means for obtaining a resultant voltage which is a function of the ratio of the change in voltage drops across the plates of the test condenser corresponding to each feed frequency when the material is located between the plates, and means responsive to the resultant voltage to give an indication of moisture content which is independent of the mass and the position of the material between the plates of the test condenser.

The relation between the change in voltage across the plates of a condenser having a material of the type under consideration between the plates can be expressed generally in the form $V = ABM$, where $V$ is the voltage change across the plates, $A$ is a constant dependent on the position of the material between the plates, $M$ is the mass of material between the plates and $B$ is a function of the moisture content of the material and of the frequency of the applied voltage. The change in voltage is occasioned by the change in admittance between the plates of the condenser, the admittance being a function of the mass and moisture content. In the case of wool, for instance, it is known that the moisture content can be measured by passing the material between the plates of a condenser and measuring the voltage changes corresponding to two feed frequencies $F_1$, $F_2$, applied separately. These voltage changes are a function of the moisture content and can be expressed with reasonable accuracy by the relations:

$$V_1 = AB_1M \text{ and } V_2 = AB_2M$$

where $V_1$ is the voltage change corresponding to one feed frequency, $V_2$ is the voltage change corresponding to another feed frequency and $B_1$ and $B_2$ are functions of the moisture content corresponding to the frequencies $F_1$ and $F_2$ respectively. Dividing these expressions we obtain $$\frac{V_1}{V_2} = \frac{B_1}{B_2}$$

which expresses a relation between voltage change and moisture content independent of the mass and the position of the test sample. This realization forms the basis from which the present invention has been developed. Thus, in accordance with the principles of the invention, the determination of the moisture content depends on the measurements of the ratio of two simultaneously occurring voltages in which any variation other than that due to change in moisture content occurs in such manner that any change in one of them will be compensated for by a corresponding change in the other so that, within reasonable limits of accuracy, the ratio remains unchanged.

Thus this invention includes a method for quantitatively determining at least one property of a dielectric material by measuring a function of the dielectric properties of the material, how they vary with frequency. According to this invention the material to be tested is coupled to a test condenser to which voltages of at least two different frequencies are applied. Then a signal is obtained that is a function of the ratio of changes in voltage drops across the test condenser at the respective feed frequencies when the material is coupled to the test condenser. The changes in voltage drops are occasioned by changes in the admittance of the test condenser as the dielectric is changed.

Accordingly, it is the primary object of this invention to provide a method and apparatus for determining quantitatively at least one property of a dielectric material by measuring the variation of dielectric constant with frequency. It is a further object to make such a determination independent of variations in at least one other variable property that affects the admittance of the test condenser. It is a still further object to determine moisture content of dielectric material independent of the mass of the material.

Other objects and advantages will become apparent from the following detailed description when considered with the accompanying drawings in which:

FIGURE 1 is a schematic diagram of one form of apparatus embodying the invention;

FIGURE 2 is a schematic diagram of an alternative form of apparatus embodying the invention; and FIGURE 3 is a circuit diagram showing a particular circuit arrangement which may be employed.

More particularly apparatus according to the invention comprises means for generating two voltages of different frequency which are fed simultaneously to means for obtaining two resultant voltages which are dependent on the moisture content of the material, means for filtering and thus separating the two resultant voltages, means for obtaining voltages which are proportional to the logarithms of the two resultant voltages and means for subtracting the two logarithmic voltages thus obtained to obtain a logarithmic voltage which is a function of the ratio of the two resultant voltages, said last mentioned logarithmic voltage being capable of being applied to a recording or indicating meter.

The apparatus may also include means for rectifying the voltages at some stage after filtering and before subtraction and it may also include amplifying means at any suitable point or points in the circuit.

This form of the invention is illustrated in FIGURE 1. As shown in FIGURE 1, a pair of oscillators 1, 2 are connected to a capacitance bridge 3 one of the capacitors 4 of which is used as the test capacitor between the plates of which the material, the moisture content of which it is desired to determine, is located. Before the material is placed between the plates of the test condenser the bridge is balanced or nearly balanced so that there is substantialy no voltage difference between the output terminals of the bridge. The output terminals of the bridge 3 are connected to filters 6, 7 which serve to separate the signals to produce a resultant voltage at each of the applied frequencies. These separate voltages may then be rectified by rectifiers 8, 9 and applied to logarithmic amplifiers 5, 5' to produce voltages proportional to the logarithms of $V_1$ and $V_2$. These logarithmic voltages are then applied to a subtractor 10 in which they are subtracted to give a voltage which is proportional to the logarithm of the ratio of the voltage $V_1$ and $V_2$. This voltage, which is proportional to log $V_1/V_2$ is applied to a suitably calibrated indicating or recording meter 11 so as to give a direct instantaneous or continuous reading of moisture content, independent of changes in mass.

In an alternative apparatus according to the invention, the filtering of the voltage may occur after the voltages have been converted into logarithmic voltages.

In this form of the apparatus, as shown in FIGURE 2, the oscillators 1, 2 are connected as in the apparatus shown in FIGURE 1 and the bridge 3 and capacitor 4 are as described above. However, in this form of the invention, the output terminals of the bridge 3 are connected directly to a logarithmic amplifier 5 by means of which the logarithms of the two voltage changes, $V_1$, $V_2$, obtained from the bridge 3 when the material is located between the plates of the test condenser 4 are obtained and these voltages are then fed to filters 6, 7, the voltage passed by the filter 6 being proportional to the logarithm of the voltage $V_1$ and the voltage pased by the filter 7 being proportional to the logarithm of the voltage $V_2$. These two logarithms voltages are then rectified by rectifiers 8, 9 and applied to a subtractor 10 in which they are subtracted to give a voltage which is proportional to the logarithm of the ratio of the voltages $V_1$ and $V_2$. This resultant voltage which is proportional to log $V_1/V_2$ is applied to a suitably calibrated indicating or recording meter 11, so as to give a direct, either instantaneous or continuous, reading of moisture content.

FIGURE 3 shows in more detail one particular circuit which has been designed for carrying the invention into practical effect and which corresponds to the apparatus described with reference to the schematic diagram of FIGURE 2.

Tubes 12 and 13, together with their associated components, for a Wien bridge oscillator corresponding to the oscillator 1 of FIGURE 2 and oscillating at a frequency $F_1$ which for practical purposes may be chosen at $10^3$ cycles/second, while tubes 14 and 15 together with their associated components, for a second Wien bridge oscillator corresponding to oscillator 2 of FIGURE 2 and oscillating at a frequency $F_2$ which may be $50 \times 10^3$ cycles per second. It should be noted that the frequencies employed are not critical and need not correspond to the particular frequencies stated. All that is necessary is that they are:

(a) Far enough apart so that they may later be separated after mixing, (b) High enough to allow the use of standard circuit components (this of course is a purely economic consideration to avoid the necessity for employing specially made chokes etc.).

In operation, the two frequencies from the oscillators are fed to the bridge 3, the capacitor 4 of which forms the test capacitor of the apparatus. The material to be tested is placed between the plates of this test capacitor and the resultant out-of-balance voltages of the bridge are fed to an amplifier tube 16 and thence to tubes 17 and 18 which altogether form the logarithmic amplifier 5 of a known type. The two frequencies are not maintained separately in this amplifier but are allowed to mix therein. Under some circumstances this is of advantage since any changes in the properties of the tubes, particularly those affecting amplification, will affect both frequencies to the same extent and will therefore tend to cancel out. The output from the tube 18 of the logarithmic amplifier 5 is then fed through a transformer to tuned circuits 19 and 20 which form the filters 6 and 7, respectively, to separate the two frequencies $F_1$ and $F_2$ so that the voltage input to a tube 21 is substantially of frequency $F_1$ and the input voltage to a tube 22 is substantially of frequency $F_2$. The tubes 21 and 22 act as amplifiers and, since the voltages fed to them have previously been logarithmically amplified and then separated by tuned circuits 19 and 20, the output from tube 21 will be proportional to the logarithm of the out-of-balance voltage across the bridge at frequency $F_2$. Further tuned circuits 23 and 24 on the output sides of tubes 21 and 22 serve to further filter the outputs and ensure that the frequencies are properly separated. These separated outputs are then fed to separate parts of a rectifier tube 25 which correspond to the rectifiers 8 and 9 of FIGURE 2 and which provide direct current voltages proportional to the voltages of the two frequencies fed to them. These direct current voltages can now be subtracted and this is achieved by applying them to the subtractor 10 so that the voltage between the points A and B is proportional to the difference between the two voltages. Thus the voltage between A and B is proportional to log $V_1/V_2$ where $V_1$ is the bridge-out-of-balance voltage at frequency $F_1$ and $V_2$ is the bridge-out-of-balance voltage at frequency $F_2$. This voltage is substantially independent of the mass of wool between the plates of the test condenser 4 and of its distribution between the plates since changes of mass or distribution would affect the voltages at each frequency similarly and the resultant voltage would remain unchanged.

This resultant voltage, which is proportional to log $V_1/V_2$ is then applied to the indicating or recording meter 11 to indicate variations in moisture content. Preferably the meter is of the type having a zero center and is also supplied with a direct current source 26 which provides a voltage between the points B and C which is proportional to log $V'_1/V'_2$ where $V'_1$ and $V'_2$ are the bridge-out-of balance voltages at frequency $F_1$ and $F_2$ at the desired moisture content. The meter is so arranged that when log $V_1/V_2$ equals log $V'_1/V'_2$ the meter indicates zero. If the material is too wet the meter will deflect in one direction and if it is too dry it will deflect in the opposite direction in accordance with whether $V_1/V_2$ is greater or less than $V'_1/V'_2$. A condenser 27 and a resistance 28 may also be placed in the meter circuit to ensure that short term fluctuations in moisture content will not affect the meter.

In a modification of the apparatus which is not shown in the drawings, the capacitance bridge 3 is replaced by a test condenser which is arranged in series with a standard condenser having a capacitance which is large relative to the test condenser and is simultaneously supplied with A.C. at two different frequencies. The voltage changes across the standard condenser corresponding to the two frequencies when material is passed between the plates may be represented by $V_1$ and $V_2$. These voltages $V_1$ and $V_2$ are then separately amplified and rectified by suitable means such as a pair of amplifying pentodes, the grid circuit of one being tuned to the higher frequency and the grid circuit of the other being tuned to the lower frequency, followed by two diode detector valves. The voltages are then fed, for instance, into a pair of logarithmic amplifiers to give, after suitable subtraction, a voltage which is proportional to log $V_1/V_2$. We have, therefore, a voltage which is a function of the ratio $V_1/V_2$ which, as previously shown, is equal to $B_1/B_2$.

If a single source, for instance a pentode valve, is used to supply the two frequencies and only one valve is used to logarithmically amplify the two measured voltages before rectification, the added advantage of the cancellation of any outside disturbances is obtained since any change in one voltage will be compensated for by a corresponding change in the other voltage so that an ultimate null effect is produced.

The fact that the moisture content is indicated by a function of the ratio $V_1/V_2$ and the two voltages are measured simultaneously allows the moisture content of adulterated material such as greasy wool or dyed textiles to be measured since each of the voltages $V_1$ and $V_2$ will be similarly affected and there will be no substantial change in the ratio due to these effects.

Although the above description has been directed in particular, to the use of the invention with wool and other textile materials, it is applicable to other dielectric materials such as tobacco, of which the dielectric constant changes as the frequency of a voltage applied to them changes. The circuit elements particularly described may also be varied without departing from the spirit and scope of the invention.

What is claimed is:

1. Apparatus for determining the moisture content in material of the type referred to, comprising a test condenser having plates between which the material may be located, means for coupling to the test condenser at least two voltages of different frequencies, means coupled to the test condenser for obtaining a resultant voltage indicative of the ratio of the change in magnitude of voltage drops across the plates of the test condenser corresponding to each frequency when the material is located between the plates, and means responsive to said resultant voltage to give an indication of moisture content which is independent of the mass and the position of the material between the plates of the test condenser.

2. A system for quantitative measurement of at least one property of a dielectric material having a plurality of variable properties each affecting the admittance between electrodes coupled by said material, said system comprising capacitive measurement probe means having spaced electrodes for coupling said probe means to said material, a plurality of voltage sources of different frequencies, means coupled to said sources for electrically energizing said electrodes from said sources of different frequencies, means for detecting the signals developed between said electrodes at each of said frequencies by producing detection signals indicative thereof, means coupled to said last named means for balancing out from said detection signals at each of said frequencies any component developed in the absence of said material at said probe means, and means for combining said detection signals to produce a continuous output measurement representative of said one property and substantially independent of variations in at least one other variable property of said material.

3. Apparatus for determining the moisture content of material under test comprising capacitive probe means having spaced electrodes for coupling said probe means to said material, means for energizing said capacitive probe means at at least two different frequencies, and means responsive to signals developed across said capacitive probe means induced by said material at said different frequencies for producing a continuous output measurement representative of moisture content which is independent of variations in the mass of the material under measurement, said means responsive to signals including means for balancing out from said signals at each of said frequencies any component developed in the absence of said material at said probe means.

4. Apparatus for determining the moisture content of material under test comprising a capacitive probe means having spaced electrodes for coupling said probe means to said material, means for energizing said capacitive probe means at at least two different frequencies, means responsive to signal increments across said capacitive probe means induced by said material at said different frequencies for producing a continuous output signal proportional to the ratio of said signal increments, and means responsive to said output signal for producing a measurement representing moisture content which is independent of variations in the mass of the material under measurement.

5. Apparatus for quantitative determination of at least one property of a dielectric material, said apparatus comprising a plurality of sources of electrical signals at different respective frequencies, detecting means, and capacitive probe means coupled to said sources and having spaced electrodes arranged for applying electrical signals from said sources to at least a portion of said material and coupling said detecting means to said portion, said detecting means including means for deriving separate signals each resulting from the signals applied to said portion from a respestive source as these applied signals are influenced by the mass of said material and the dielectric properties of said material at the frequency of that source, and means for combining said separate signals to produce a continuous resultant signal that is a function of the ratio of said separate signals and quantitatively indicative of said property.

6. Apparatus for quantitative determination of at least one property of a dielectric material, said apparatus comprising a plurality of sources of electrical signals at different respective frequencies, detecting means, and capacitive probe means coupled to said sources and having spaced electrodes arranged for applying electrical signals from said sources to at least a portion of said material and coupling said detecting means including means for deriving separate signals each resulting from the signals applied to said portion from a respestive source as these applied signals are influenced by the mass of said material and the dielectric properties of said material at the frequency of that source, and means for combining said separate signals to produce a continuous resultant signal that is quantitatively indicative of said property, said apparatus further including a capacitor connected in circuit with said probe means to balance out from said separate signals any signals developed in the absence of said material at said probe means, whereby said separate signals include substantially only the change occasioned by the introduction of said dielectric material to said probe means.

7. Apparatus for quantitative determination of at least one property of a dielectric material, said apparatus comprising a plurality of sources of electrical signals at different respective frequencies, detecting means, and capacitive probe means coupled to said sources and having spaced electrodes arranged for applying electrical signals from said sources to at least a portion of said material and coupling said detecting means to said portion, said detecting means including means for deriving separate signals each resulting from the signals applied to said portion from a respective source as these applied signals are influenced by the mass of said material and the dielectric properties of said material at the frequency of that source, and means for combining said separate signals to produce a continuous resultant signal that is a function of the ratio of said separate signals and quantitatively indicative of said property, said apparatus further including a bridge circuit coupling said sources to said capacitive probe means, said capacitive probe means being connected in one arm of said bridge circuit, said bridge circuit including a capacitor connected in another arm thereof, said capacitor providing such capacitance as to balance said bridge circuit in the absence of said material at said probe means, whereby said separate signals include substantially only the change occasioned by the introduction of said dielectric material to said probe means.

8. A method for quantitatively determining at least one property of a dielectric material having a plurality of variable properties each affecting the admittance between electrodes coupled by said material, said method comprising applying electrical signals at a plurality of different frequencies to at least a portion of the material under test, deriving separate output signals each indicative of the difference between the signal thereupon developed between electrodes coupled together by a portion of said material to which said applied signals are applied at a respective frequency and the signal developed between said electrodes at said respective frequency in the absence of said material, and combining said separate signals to produce a continuous resultant signal that is quantitatively indicative of said property and substantially independent of variations in at least one other variable property of said material.

9. A method for the quantitative determination of at least one property of a dielectric material, said method comprising applying electrical signals at a plurality of different frequencies to at least a portion of the material, deriving separate signals each resulting from the signals applied at a respective frequency as these applied signals are influenced by the mass of said material and the dielectric properties of said material at that frequency, and combining said separate signals to produce a continuous resultant signal that is a function of the ratio of said separate signals and quantitatively indicative of said property.

10. A method for quantitatively determining at least one property of a dielectric material, said method comprising passing said material continuously through a test region, applying electrical signals at a plurality of different frequencies to the material in said region, deriving separate output signals each indicative of the difference between the voltage developed between electrodes coupled together by said material in said region at a respective frequency and the voltage developed between said electrodes in the absence of said material at said respective frequency, and combining said separate signals to produce a continuous resultant signal that is a function of the ratio of said separate signals and quantitatively indicative of said property.

11. The method of quantitatively determining the moisture content of a dielectric material under test which comprises applying electrical signals at first and second significantly different frequencies to a pair of spaced electrodes defining a field region, continuously passing said material through said field region whereby the admittance of said electrode pair varies as a function of the dielectric properties of said material in said field region, generating a first signal indicative of the difference between said admittance at said first frequency and the admittance of said electrode pair at said first frequency in the absence of said material, generating a second signal indicative of the difference between said admittance at said second frequency and the admittance of said electrode pair at said second frequency in the absence of said material, and continuously combining said signals to produce a continuous resultant signal that is a function of the ratio of said first and second signals and quantitatively indicative of said moisture content.

References Cited in the file of this patent

UNITED STATES PATENTS

| | | |
|---|---|---|
| 2,527,208 | Berry et al. | Oct. 24, 1950 |
| 2,535,026 | Anderson | Dec. 26, 1950 |
| 2,535,027 | Anderson | Dec. 26, 1950 |
| 2,576,249 | Barney | Nov. 27, 1951 |
| 2,625,583 | Broding | Jan. 13, 1953 |
| 2,744,233 | Paivinen | May 1, 1956 |
| 2,908,166 | Johnson | Oct. 13, 1959 |
| 2,920,206 | Heller | Jan. 5, 1960 |
| 2,929,020 | Mayes | Mar. 15, 1960 |
| 2,950,435 | Locher et al. | Aug. 23, 1960 |

FOREIGN PATENTS

| | | |
|---|---|---|
| 622,470 | Great Britain | May 3, 1949 |